No. 755,594. PATENTED MAR. 22, 1904.
L. P. GRAHAM.
MECHANICAL SORTER FOR SEED CORN.
APPLICATION FILED JAN. 6, 1903.
NO MODEL.
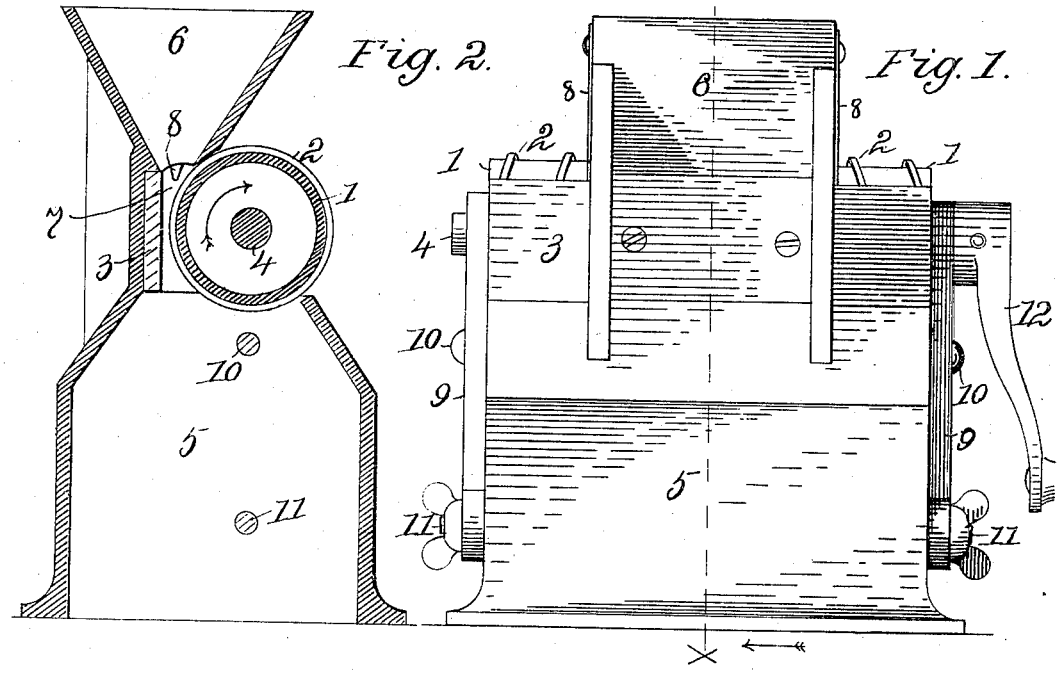
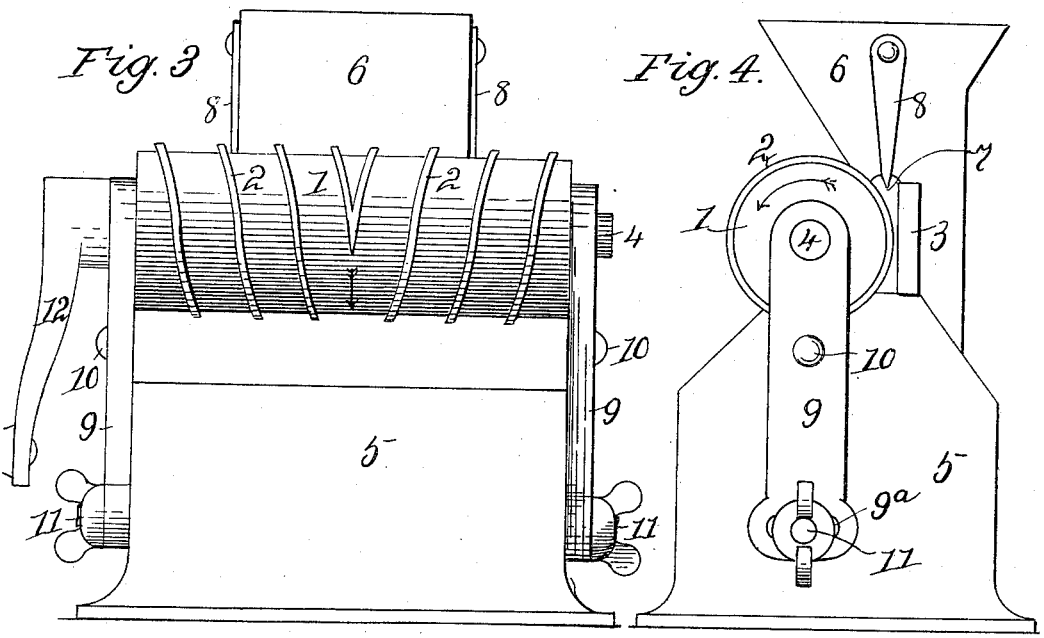
Witnesses.
Nora Graham.
Fay Graham.
Inventor.
Levi P. Graham.

No. 755,594. Patented March 22, 1904.

UNITED STATES PATENT OFFICE.

LEVI P. GRAHAM, OF DECATUR, ILLINOIS.

MECHANICAL SORTER FOR SEED-CORN.

SPECIFICATION forming part of Letters Patent No. 755,594, dated March 22, 1904.

Application filed January 6, 1903. Serial No. 138,072. (No model.)

*To all whom it may concern:*

Be it known that I, LEVI P. GRAHAM, of the city of Decatur, county of Macon, and State of Illinois, have invented a certain new and useful Mechanical Seed-Corn Sorter, of which the following is a specification.

The object of this invention is to assort Indian corn intended for planting in edge-drop planters and to exclude grains which from their size or shape are incapable of being readily received in edge-drop cells.

It has been demonstrated that corn of the usual conformation may be dropped from a planter with great accuracy if the seed wheels or plates of the planter are provided with cells each adapted to receive a single grain standing on edge; but there are grains on almost all ears that are substantially round or of an irregular shape and so thick in their thinnest dimensions that a cell narrow enough to exclude two thin grains will not receive one of them. These grains accumulate in the bottoms of the seedboxes as the thin grains are dropped until they interfere seriously with the operation of the planter, and it is very difficult to care for them after they are once in the seedboxes.

As the greater number of round and abnormal grains are at the ends of the ears, they may be to a large extent excluded from the seedbox by cutting off the ends of the ears before shelling; but this necessitates the use of a hand-sheller or of a shelling by hand, and it does not exclude round or odd-shaped grains that may chance to grow between the ends of the ears.

My invention provides means whereby round and irregular grains may be thrown out of a mass of mixed shelled corn and all grains of regular shape much above the average in edgewise measurement may also be excluded. The sorter may be set to conform to a seed-plate having cells of a certain width with positive assurance that all grains passing through the machine will be narrow enough to pass through the cells of the seed-plate.

The invention comprises a hopper for the corn to be sorted, a slot in the bottom of the hopper through which grains of proper size and shape may pass edgewise, and means acting lengthwise of the slot to carry off grains which from their size or shape are not able to pass through the slot. To permit the escape of unsuitable grains, an opening is made through a side of the hopper a little above the narrowest part of the slot, and this opening is preferably provided with a yielding closure or retarder. The corn is agitated in the hopper by means of the appliance used to discharge unsuitable grains, and the suitable grains fall vertically, or approximately so, by action of gravity, while the unsuitable grains are carried in an approximately horizontal direction by mechanical means.

In the drawings forming part of this specification, Figure 1 is a plan of a rear elevation of a structure embodying my invention. Fig. 2 is a section on line X in Fig. 1. Fig. 3 is a front elevation of the structure, and Fig. 4 is an end elevation thereof.

A seed-hopper is shown at 6, and a receptacle for the suitable grains is shown at 5. A slot is formed in the bottom of the hopper, and the walls of the slot are preferably formed by a cylinder 1 and an opposing plate 3. The cylinder is set away from the plate a distance equal to the average thickness of a grain of corn, and a spiral rib 2 is formed on the perimeter of the cylinder. An end of the hopper has an opening 7 above the nearest approach of the cylinder to plate 3, and said opening is large enough to permit the passage of an extremely large and irregular-shaped grain of corn. The opening 7 is preferably closed or obstructed by a yielding obstruction, exemplified in this instance by the flat spring-strip 8. The shaft or trunnions 4 of the cylinder 1 journal in the upper ends of bars 9, and a crank-arm 12 provides means for turning the shaft in its bearings. The bars 9 are in this instance secured to the end walls of the receptacle 5 by pivot-pins 10 and are also held by bolts 11. The lower ends of the bars are slotted, as shown at 9$^a$ in Fig. 4, and the slots provide means for swinging the bars on pivots 10, so as to make the cylinder approach the plate more or less closely to conform to the general average of the corn to be sorted.

The rib 2 coils in opposite directions from the longitudinal center of the cylinder, and the pitch of the rib is greater than the length of a grain of corn. Grains are guided edgewise to the cylinder by the inclined sides of the hopper, and as the cylinder is rotated in the direction indicated by the arrows on the drawings the corn is carried toward the ends of the cylinder by the screw action of the rib. The grains that are thin enough to pass between the cylinder and the plate 3 will fall into receptacle 5, while thicker grains will be discharged at the ends of the cylinder outside the receptacle.

To insure against carrying off thin grains with the unsuitably thick, the cylinder and the plate are extended beyond the hopper. This enables the thin grains to pass through the slot after leaving the hopper and before reaching the ends of the cylinder.

I claim—

1. In a mechanical sorter for seed-corn, the combination of a horizontal cylinder having spiral ribs extending from its longitudinal center in opposite directions and a surface opposed to a side of the cylinder and forming therewith a trough in which grains of corn will be arranged edgewise, the surface being separated from the cylinder far enough to form a slot through which suitable grains of corn may fall and the slot being open at its ends to permit the discharge of unsuitable grains.

2. In a mechanical sorter for seed-corn, the combination of a horizontal cylinder having spiral ribs extending from its longitudinal center in opposite directions, a surface opposed to a side of the cylinder and forming therewith a trough in which grains of corn will be arranged edgewise, the surface being separated from the cylinder far enough to form a slot through which suitable grains of corn may fall and the slot being open at its ends to permit the discharge of unsuitable grains, and a hopper above the cylinder between the ends thereof, substantially as described.

In testimony whereof I sign my name in the presence of two subscribing witnesses.

LEVI P. GRAHAM.

Witnesses:
 ROSA VOELCKER,
 NORA GRAHAM.